US008262134B2

(12) United States Patent
Schwenk et al.

(10) Patent No.: US 8,262,134 B2
(45) Date of Patent: Sep. 11, 2012

(54) VALUE DOCUMENT

(75) Inventors: Gerhard Schwenk, Puchheim (DE); Thomas Giering, Kirschseeon (DE); Gerhard Stenzel, München (DE); Wittich Kaule, Emmering (DE)

(73) Assignee: Giesecke & Devrient GmbH, Munich (DE)

( * ) Notice: Subject to any disclaimer, the term of this patent is extended or adjusted under 35 U.S.C. 154(b) by 214 days.

(21) Appl. No.: 10/575,079

(22) PCT Filed: Oct. 5, 2004

(86) PCT No.: PCT/EP2004/011128
§ 371 (c)(1),
(2), (4) Date: Jan. 24, 2007

(87) PCT Pub. No.: WO2005/035270
PCT Pub. Date: Apr. 21, 2005

(65) Prior Publication Data
US 2007/0273141 A1 Nov. 29, 2007

(30) Foreign Application Priority Data
Oct. 8, 2003 (DE) ................................. 103 46 630

(51) Int. Cl.
*B42D 15/00* (2006.01)
*B42D 15/10* (2006.01)
*G09C 3/00* (2006.01)

(52) U.S. Cl. ................ 283/91; 283/72; 283/74; 283/75; 283/94; 283/110; 283/901

(58) Field of Classification Search .................... 283/72, 283/74, 75, 77, 86, 94, 901, 904, 92, 110, 283/91; *A63F 1/02; B32B 3/00; G06F 17/60; G07F 7/04*
See application file for complete search history.

(56) References Cited

U.S. PATENT DOCUMENTS

| | | | | |
|---|---|---|---|---|
| 4,407,525 | A * | 10/1983 | Hoppe | 283/110 |
| 4,451,530 | A * | 5/1984 | Kaule et al. | 283/92 |
| 4,455,039 | A * | 6/1984 | Weitzen et al. | 283/83 |
| 5,169,155 | A * | 12/1992 | Soules et al. | 273/293 |
| 5,259,907 | A * | 11/1993 | Soules et al. | 283/74 |
| 6,155,605 | A | 12/2000 | Bratchley et al. | |
| 6,165,592 | A | 12/2000 | Berger et al. | |
| 6,383,618 | B1 | 5/2002 | Kaule et al. | |
| 6,491,324 | B1 * | 12/2002 | Schmitz et al. | 283/82 |
| 6,506,476 | B1 * | 1/2003 | Kaule et al. | 428/195.1 |
| 2003/0050891 | A1 * | 3/2003 | Cohen | 705/42 |
| 2004/0084277 | A1 * | 5/2004 | Blair | 194/206 |

FOREIGN PATENT DOCUMENTS

| | | |
|---|---|---|
| DE | 198 03 997 | 8/1999 |
| DE | 198 60 093 | 7/2000 |
| EP | 0 052 624 | 6/1982 |
| EP | 0 053 124 | 6/1982 |
| EP | 1 253 241 | 10/2002 |
| WO | WO 97/39428 | 10/1997 |

OTHER PUBLICATIONS

U.S. Appl. No. 10/574,838, filed Apr. 6, 2006.

(Continued)

*Primary Examiner* — Edward Tolan
*Assistant Examiner* — Justin V Lewis
(74) *Attorney, Agent, or Firm* — Bacon & Thomas, PLLC

(57) ABSTRACT

This invention relates to a value document, in particular a bank note, having a value document substrate and at least two different feature substances for checking the value document. According to the invention, a first feature substance is incorporated into the volume of the substrate of the value document. A second feature substance is formed by a luminescent substance which is applied to the value document substrate in the form of a coding.

31 Claims, 1 Drawing Sheet

OTHER PUBLICATIONS

U.S. Appl. No. 10/575,078, filed Apr. 7, 2006.
U.S. Appl. No. 10/575,074, filed Apr. 7, 2006.
U.S. Appl. No. 10/575,080, filed Apr. 7, 2006.
U.S. Appl. No. 11/632,424, filed Jan. 12, 2007.

* cited by examiner

VALUE DOCUMENT

BACKGROUND

A. Field

This invention relates to a value document, in particular a bank note, having a value document substrate and at least two different feature substances for checking the value document.

B. Related Art

The print WO 97/39428 discloses a value document whose substrate has, in one area, machine authenticatable authenticity features for different security levels. The value document contains a machine authenticatable low security feature which is formed from a single material. Upon an interrogation the low security feature provides a yes/no response indicating the presence or absence of the interrogated property. The low security feature is used for authenticity checking in applications where a simple detector is used, for example retail outlets.

A likewise machine authenticatable high security feature has properties that are difficult to detect allowing an in-depth interrogation of the value document and a much higher level of authentication. The check of the high security feature is elaborate and effected for example in central banks. Said high security feature is a homogeneous mixture of two substances with different physical properties, such as the excitation wavelength for a luminescence emission or coercivity, etc.

The system known from WO 97/39428 has the disadvantage, however, of permitting an elaborate authenticity check of the value documents but not allowing any statement about the type or value of the particular value document. For machine processing of value documents, in particular of bank notes, it is also desirable to detect by machine the type of document, e.g. the currency or the denomination of a known currency.

On these premises the invention is based on the problem of proposing a generic value document that involves not only increased falsification security but at the same time also a possibility of value recognition.

Value recognition is understood in the context of the present invention to mean the evaluation of information present in coded form for a certain user group. The coded information can be, in the case of a bank note, for example the denomination, the currency, the series, the issuing country or other special features of the bank note.

SUMMARY OF THE DISCLOSURE

The inventive value document has a first feature substance incorporated into the volume and substance of the value document substrate, and a second feature substance which is a luminescent substance and is applied to the value document substrate in the form of a coding. As explained in detail hereinafter, this creates a complex feature system that is difficult to imitate for a forger and that permits both an authenticity check and value recognition by users from different user groups.

For example, users of one user group can use a characteristic property of the first feature substance for the authenticity check and the coding formed by the first feature substance for value recognition. Users of another user group can employ a characteristic property, in particular the luminescence, of the second feature substance for the authenticity check, and use the coded application of the luminescent substance for value recognition. Both user groups can thus use the codings formed by the feature substances to be able to carry out not only the authenticity check but also value recognition on the document without any great additional effort. The implementation of the authenticity check and the value recognition will be described in greater detail below.

Said user groups may be central banks, commercial banks, any commercial enterprises such as local train services, department stores or vending machine operators, etc.

Analysis of the feature system is very difficult and elaborate for third parties, since it is not readily recognizable which substances and in particular which substance properties are used for the authenticity check of the different user groups. Even knowledge of one of the procedures for the authenticity check does not yet reveal the substances and methods used by the other user group or groups for the authenticity check.

According to a preferred embodiment of the invention, the first feature substance is distributed substantially uniformly within the volume of the value document substrate, so that sufficiently large volume elements of equal size each contain a substantially equal quantity of the first feature substance. The distribution of the feature substance can be regular, but the feature substance is preferably incorporated into the substrate volume and substance with a random distribution. If paper is used as the value document substrate, the first feature substance is preferably added to the paper stock before sheet formation.

According to an advantageous development of the invention, a third feature substance which is different from the first and second feature substances is applied to the value document substrate, preferably printed thereon. The third feature substance can be used for the authenticity check in addition or as an alternative to the first feature substance.

Besides the second feature substance, the first feature substance and/or the third feature substance can also be a luminescent substance or a mixture of luminescent substances. For the first feature substances it is preferable to use luminescent substances or mixtures that emit in the infrared spectral range and that in particular have a complex, difficult-to-imitate spectral emission characteristic. The emission characteristic can be used to produce a coding by the form of the emission and/or excitation spectra.

In particular, at least one of the feature substances is preferably a luminescent substance based on a host lattice doped with rare earth elements. It is also possible for several or all of the feature substances to be formed on the basis of a doped host lattice. Said luminescent substances can be excited e.g. by irradiating directly into the absorption bands of the rare earth ions. In preferred variants, it is also possible to use absorbent host lattices or so-called sensitizers, which absorb the excitation radiation and transfer it to the rare earth ion, which then emits the luminescence. Obviously, the host lattices and/or the dopants can be different for the different marking substances in order to obtain different excitation and/or emission ranges. Said emission characteristic can be used in particular for distinguishing the luminescent substances from similar luminescent substances. However, it can also be used for producing a coding by the form of the emission spectra or/and excitation spectra of the luminescent substances. This type of coding is not restricted to luminescent substances based on a host lattice doped with rare earth elements but can be used for all luminescent feature substances used according to the invention, this applying particularly preferably to the first feature substance.

In a preferred embodiment, the host lattice absorbs in the visible spectral range and optionally, in particular in the case of the first or third feature substance, additionally in the near infrared range up to about 1.1 μm. "Infrared range" is understood according to the invention to be the wavelength range from 750 nm and more, preferably 800 nm and more. Excitation can then be performed with high effectiveness by light sources, such as halogen lamps, LEDs, lasers, flash lamps or xenon arc lamps, so that only small amounts of the luminescent substance are required. This permits an application of the luminescent substance by usual printing processes. Furthermore, a small used amount of substance impedes detection of the used substance by potential forgers. If the host lattice also absorbs in the near infrared up to about 1.1 μm, easily detectable emission lines of the rare earth ions can be suppressed, leaving only the emission at larger wavelengths that is more elaborate to detect.

In an alternative preferred embodiment, luminescent substances are used that absorb even in the visible spectral range, preferably over most of the visible spectral range, especially preferably into the near infrared region. Then, too, emissions in these more easily accessible spectral ranges are suppressed.

The host lattice can have for example a perovskite structure or a garnet structure and be doped with a rare earth element emitting in the infrared spectral range, such as praseodymium, neodymium, dysprosium, holmium, erbium, thulium or ytterbium. Further possible embodiments of the host lattice and the dopant are specified for example in EP-B-0 052 624 or EP-B-0 053 124, whose disclosures are included in the present application in this respect.

According to an advantageous embodiment of the inventive value document, the coding extends over a predominant part of a surface of the value document, in particular over the substantially total surface of the value document. This makes it possible to obtain a further increase in the falsification security of the value document, since gaps or inserted parts of other, including other authentic, documents manifest themselves as a disturbance of the coding.

For example, in the case of documents of the same kind, such as bank notes of the same denomination, the coding or a part of the coding can be provided with a certain offset from document to document. If the documents are produced in a continuous format, this can be obtained for instance by using a print roll whose circumference is a non-integral multiple of the document size. A row of successive documents can then contain a coding with the same content or the same form, the individual documents at the same time being distinguishable from each other due to the different offset. In sheet-by-sheet printing the same result can be achieved if several printing plates with mutually offset codings or coding parts are used according to the desired repetition rate.

The coding formed by the second feature substance is a bar code according to a preferred embodiment. A bar code is understood in the context of the present invention to mean any one- or two-dimensional pattern consisting of stripes or areas with feature substance (“bars”) and stripes or areas without feature substance located between the bars (“spaces”). As a rule, the bar/space sequence represents a binary number sequence which can stand for any, also encrypted, information about the value document.

The bar code can in particular be invisible to the naked eye and only be recognizable or measurable by its emission after excitation with a suitable light source. Bar codes are particularly suitable for machine readout and provide an almost fault-free read result, in particular in connection with check digits. Bar codes to be used are for example common formats, such as the 2/5 code, the 2/5 interleaved code, the 128 code or the 39 code, but also special formats used only for the inventive value documents. It is also possible to use two-dimensional bar codes offering a particularly strongly condensed recording and increased redundancy, which makes them less sensitive to production tolerances.

The value document substrate is preferably a printed or unprinted cotton fiber paper or a coated, printed or unprinted plastic film. The material of the substrate is not essential to the invention as long as a feature substance can be incorporated into its volume. Obviously, the value document can be provided with further feature substances or further printed layers, besides the substances mentioned.

The inventive value documents are preferably bank notes, shares, credit cards, badge or identity cards, passports of any type, visas, vouchers, etc.

Application of the second feature substance to the value document substrate is preferably done using a printing process. It is possible to use for example a gravure, screen, letterpress, flexographic, ink-jet, digital, transfer or offset printing process. The printing inks used for this purpose can be transparent or contain additional coloring pigments which must not impair detection of the feature substances. In the case of the luminescent substances, they preferably have transparent areas in the excitation range and in the viewed emission range of the luminescent substances.

In the case of designs in which the value document has a paper substrate, the second feature substance can preferably also be already applied to the moist paper web, in particular sprayed on, in the form of the coding during papermaking. For this purpose, the second feature substance is for example passed onto the paper web surface in a suspension as a laminar jet at low jet pressure at a time when the paper web is still moist but already sufficiently solidified. The low jet pressure prevents the fiber structure of the paper web from changing upon application of the suspension. The place of application can then not be recognized by the naked eye on the finished paper either in reflected light or in transmitted light. Further possibilities and details of the application of the feature substance to a moist paper web are described in the print EP 1 253 241 A2, whose disclosure is included in the present application in this respect.

If a third feature substance is provided, it can fundamentally be applied to the value document in any form and distribution. However, it is preferred to print the third feature substance on the value document substrate likewise in the form of a coding. The second and third feature substances can form codings of the same type or of different types. For example, the second feature substance can be applied in the form of a bar code, and the third feature substance in the form of an alphanumeric character string. The first and third feature substances can serve one user group as alternative possibilities for the authenticity check, or they can be used by two different user groups.

During production of the value document, the second and third feature substances can be applied to the value document substrate, in particular printed thereon, as a mixture or as separate substances. In an advantageous embodiment of the production method, the third feature substance can be admixed to a printing ink, in particular a visible printing ink, and printed on the value document substrate together with said printing ink.

Obviously, further feature substances can be applied, or incorporated into the substrate, e.g. to further increase the falsification security or to include further user groups.

In a method for checking or processing an above-described value document, the authenticity of the value document is checked and a value recognition of the document carried out by using at least one characteristic property of the first feature substance or the luminescent substance for checking the authenticity of the value document, and the coding formed by the luminescent substance and/or the first feature substance for value recognition of the value document. The authenticity of the value document is preferably determined by different user groups using different feature substances. This means that if the user belongs to the first user group, the authenticity of the document is determined using at least one characteristic property of the first feature substance. If the user belongs to a second user group, said user has at its disposal at least one characteristic property of the second feature substance for the authenticity check.

The value recognition is done by the user of a first user group preferably using the coding formed by the first feature substance and by the user of a second user group using the coding formed by the luminescent second feature substance.

If the value document is provided with a third feature substance, a further checking or processing method provides for using at least one characteristic property of the first and/or third feature substance for checking the authenticity of the value document, and the coding formed by the first and/or third feature substance for value recognition of the value document, if the user belongs to the first user group. For example, some of the users from the first user group can use the first feature substance for the authenticity check, and others the third feature substance. If the user belongs to the second user group, at least one characteristic property of the luminescent substance is used for checking the authenticity of the value document, and the coding formed by the luminescent second feature substance is used for value recognition of the value document.

If the feature substances are luminescent substances, both methods expediently involve irradiating with radiation from the excitation range of the particular luminescent substance, determining their emission at at least one wavelength from the emission range of the luminescent substances, and carrying out the check of authenticity and/or the value determination on the basis of the determined emission. In an advantageous embodiment, the luminescent substances are irradiated with visible and/or infrared radiation and the emission of the luminescent substances determined in the infrared spectral range.

Both methods involve the advantage that both user groups can carry out not only the authenticity check but also a value recognition on the document without any great additional effort. A further advantage is that the users of the first and second user groups use, for evaluation, nonoverlapping combinations of the feature substances or the coding formed thereby. Therefore, an analysis of an apparatus for authenticity detection of the second user group, for example, gives no indication of the procedure in the authenticity check of the first user group, since said detection device does not interrogate any of the properties of the first or third feature substance.

Further embodiments as well as advantages of the invention will be explained hereinafter with reference to the figures. For more clarity, the figures do without a representation that is true to scale and to proportion.

DETAILED DESCRIPTION OF PREFERRED EMBODIMENTS OF THE INVENTION

Figure 1:
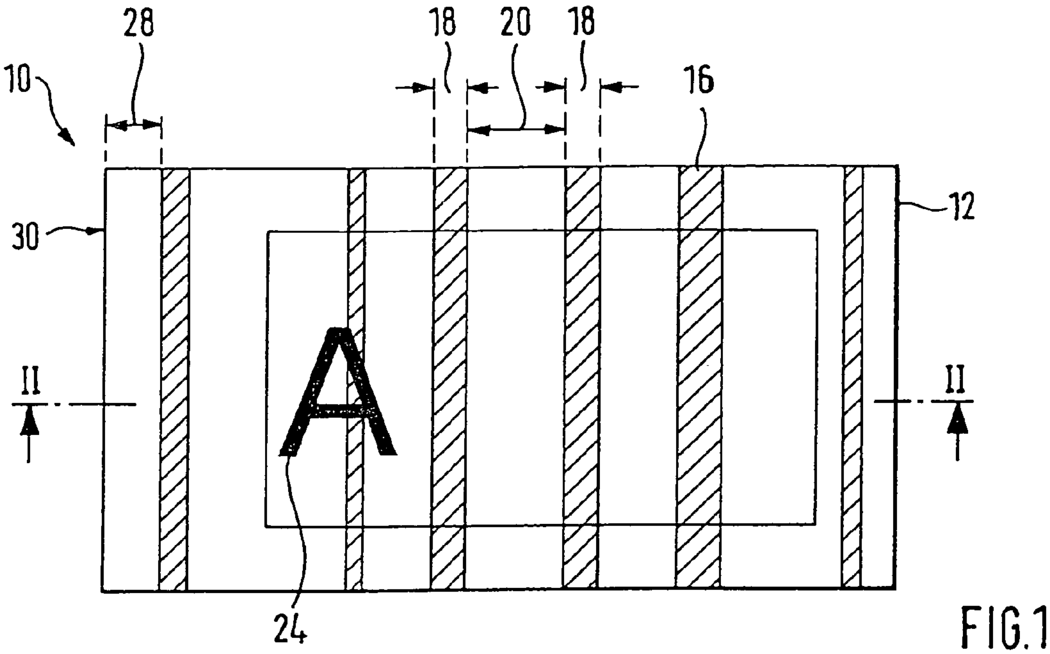
FIG. 1 a schematic representation of a bank note according to an embodiment of the invention, and FIG. 2 a section through the bank note of FIG. 1 along the line II-II.
Figure 2:
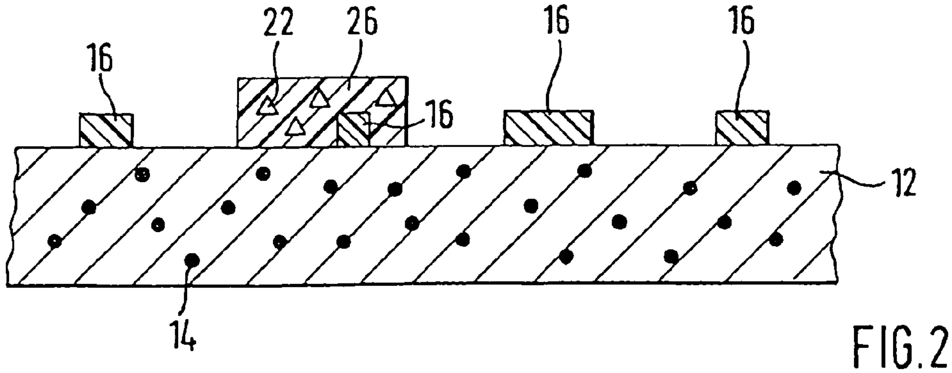

The invention will now be explained by the example of a bank note. FIGS. 1 and 2 show schematic representations of a bank note 10 equipped with different security features for a check by different user groups. FIG. 1 shows the bank note 10 in a plan view and FIG. 2 a cross section along the line II-II of FIG. 1.

As seen best in FIG. 2, a first feature substance 14 is distributed uniformly within the volume and substance of the paper substrate 12 of the bank note 10. In this embodiment, the first feature substance 14 is a mixture of different luminescent substances which, after excitation, emits radiation with a complex and difficult-to-imitate spectral distribution. The spectral distribution itself serves as a coding here.

A second feature substance 16 is printed on the upper side of the bank note 10 in stripe form. The width of the individual stripes 18 and the width of the particular spaces 20 form a bar code in which the denomination and the currency of the bank note 10 are stored in encrypted form. The bar code 18, 20 extends substantially over the total surface of the bank note 10.

In this embodiment, the second feature substance 16 is also a luminescent substance. Unlike the first feature substance 14, the second feature substance 16 is selected specifically so that its luminescence can be excited easily and detected with commercially available detectors.

The authenticity check and value recognition is now carried out by two different user groups using nonoverlapping combinations of the feature substances 14, 16, or their arrangement. The bank note 10 of the embodiment is designed for a first user group with high security requirements and a second user group with comparatively low security requirements.

The second user group can involve for example simple machines taking bank notes in parking lots, or vending machines. For this use it is particularly expedient to employ inexpensive detection apparatuses for the authenticity check and value recognition.

A user of the second user group checks the authenticity of a bank note 10 by illuminating the bank note with excitation light and detecting the luminescence signal of the second feature substance 16. If a corresponding luminescence signal is received, the bank note is rated as authentic by the user. Due to the choice of the luminescent substance this detection can be done with commercially available, inexpensive detectors. If the bank note is recognized as authentic, its value can be taken from the coding 18, 20. The authenticity check and the value recognition can also be carried out in one step.

The first feature substance 14 with its concrete but complex emission serves as an authenticity mark for the first user group with its higher security requirements. The first user group can comprise for example banks, where the authenticity of the bank notes is checked with high-quality and elaborate detectors. Here, too, a bank note is irradiated with excitation light and the correct spectral response of the feature substance 14 evaluated for the check. If the bank note is recognized as authentic, its value can readily be taken from the spectral coding formed by the first feature substance by performing an in-depth analysis of the emission spectrum, whereby half-widths and/or luminescence peak intervals and/or decay times, etc., are rated.

The two user groups thus evaluate different combinations of the feature substances or their arrangement on the bank note 10. This has the additional advantage that an analysis of a comparatively easily accessible apparatus for detection of authenticity of the second user group does not give any indication of the procedure and basic principles of the authenticity check of the first user group.

In addition to the stated feature substances, a third feature substance 22 can be printed on the bank note 10 in the form of a further coding 24. The further coding can likewise be formed as a bar code or also as an alphanumeric character string, as indicated in FIG. 1. The third feature substance is formed in the embodiment by a further luminescent substance 22 which is admixed to a visible printing ink 26 with which a printed image, for example the denomination of the note, is printed on the bank note substrate 12.

In this embodiment, the third feature substance 22 is formed on the basis of a host crystal doped with a rare earth element, which when excited in the visible spectral range shows a luminescence in the infrared spectral range above about 1.5 μm and does not emit in the visible and in the near infrared. The luminescence of the third feature substance 22 cannot be detected with common detectors, which are sensitive up to about 1.1 μm. The third feature substance 22 can therefore be employed by the users of the first user group for a high-quality authenticity check alternatively or in addition to the first feature substance 14.

Referring again to FIG. 1, the first stripe 18 of the coding is disposed at a certain distance 28 from the left edge 30 of the bank note 10. If said distance 28 is varied for different bank notes of the same series, for example by using different printing plates with different distances 28, this results in additional protection from forgery, since gaps or inserted parts of other bank notes manifest themselves as a disturbance in the coding 18, 20. For example, it can be provided that only certain combinations of stripe widths 18 and space widths 20 form permissible codings. Stripes that are too wide or too narrow, as appear upon attempts at tampering with the bank note, can then be recognized as impermissible in the check of the bank notes and the bank note rejected as inauthentic.

The invention claimed is:

1. A value document, comprising a value document substrate and at least two different feature substances having properties that enable checking of the authenticity of the value document, comprising a first feature substance that is incorporated into and distributed uniformly throughout the volume and substance of the substrate of the value document, and a second feature substance that is formed by a luminescent substance which is provided on the value document substrate in the form of a first coding, said first coding also configured to enable value recognition of the document, wherein the first feature substance comprises a mixture of luminescent substances having a complex spectral distribution, said complex spectral distribution providing by its spectral characteristics a second coding by the form of the emission and/or excitation spectra of the mixture.

2. The value document according to claim 1, wherein a third feature substance is provided on the value document substrate, which is different from the first and second feature substances.

3. The value document according to claim 2, wherein the third feature substance is formed by at least one of a luminescent substance and a mixture of luminescent substances.

4. The value document according to claim 1, wherein at least one of the feature substances is formed on the basis of a host lattice doped with rare earth elements.

5. The value document according to claim 1, wherein the first coding of the second feature substance extends over a predominant part of a surface of the value document.

6. The value document according to claim 1, wherein the first coding provided by the second feature substance is a bar code.

7. The value document according to claim 1, wherein the value document substrate comprises a printed or unprinted cotton paper.

8. The value document according to claim 1, wherein the value document substrate comprises a printed or unprinted plastic film.

9. The value document according to claim 1, wherein the second feature substance is printed on the value document substrate.

10. The value document according to claim 1, wherein the substrate is paper formed from a moist paper web during its production, and the second feature substance is applied to the moist paper web in the form of the first coding during papermaking.

11. The value document according to claim 2, wherein the third feature substance is provided on the value document substrate in the form of a third coding.

12. The value document according to claim 2, wherein the third feature substance is printed on the value document substrate together with a printing ink in the form of a printed image.

13. A method for producing a value document that is recited in claim 1, comprising the steps: incorporating the first feature substance distributed uniformly throughout the volume and substance of the value document substrate, and applying the second feature substance to the value document substrate in the form of the second coding.

14. The production method according to claim 13, wherein the second feature substance is printed on the value document substrate.

15. The production method according to claim 13, wherein the value document substrate is formed by a printed or unprinted cotton paper formed from a moist paper web during its production, and the second feature substance is sprayed onto the moist paper web during papermaking.

16. The production method according to claim 13, wherein a third feature substance is applied to the value document substrate.

17. The production method according to claim 16, wherein the second and third feature substances are applied to the value document substrate as a mixture.

18. The production method according to claim 16, wherein the third feature substance is printed on the value document substrate together with a printing ink in the form of a printed image.

19. A method for checking or processing a value document that is recited in claim 1, comprising the steps: checking the authenticity and value of the value document by checking the authenticity of the value document using a coding obtained by at least one spectral characteristic property in the form of the emission and/or excitation spectra of either or both the first feature substance and the luminescent substance of the second feature substance, and using the first coding formed by the luminescent substance of the second feature substance for carrying out value recognition of the value document.

20. The method according to claim 19, including a user of a first user group checking the authenticity of the value document by inspecting at least one spectral characteristic property of the first feature substance, and a user of the first user group recognizing the value of the value document by inspecting the second coding provided by said first feature substance.

21. The method according to claim 20, including using by a user of a second user group at least one spectral characteristic property of the luminescent substance of the second feature substance to check the authenticity of the value document, and using by a user of the second user group the first coding formed by the luminescent substance of the second feature substance to recognize the value of the value document.

22. The method according to claim 21, including using by a user the first user group at least one spectral characteristic property of at least one of the first and a third feature substance that is different from the first and second feature substance to check the authenticity of the value document, and the second coding formed by the first feature substance to recognize the value of the value document; and using by a user of the second user group at least one spectral characteristic property of the second feature substance to check the authenticity of the value document, and the first coding formed by the second feature substance to recognize the value of the value document.

23. The method according to claim 22, wherein, for the authenticity check or value recognition by a user of the first user group, the first feature substance is irradiated with radiation from its excitation range, the emission is determined at least one wavelength from the emission range of the first feature substance, and the check of at least one of authenticity and the value recognition is carried out on the basis of the determined emission.

24. The method according to claim 23, wherein for the authenticity check or value recognition by a user of the second user group the second feature substance is irradiated with radiation from its excitation range, the emission is determined at at least one wavelength from the emission range of the second feature substance, and the check of at least one of authenticity and the value recognition is carried out on the basis of the determined emission.

25. The method according to claim 24, wherein at least one of the first and second feature substance is irradiated with at least one of visible and infrared radiation, and the emission of the irradiated feature substance is determined in the infrared spectral range.

26. The method according to claim 23, wherein the irradiation is performed with a light-emitting diode or laser diode.

27. The value document according to claim 2, wherein the third feature substance is provided as a printing.

28. The value document according to claim 5, wherein the first coding extends over substantially the total surface of the value document.

29. The value document according to claim 11, wherein the third feature substance is provided as a printing.

30. The production method according to claim 16, wherein the third feature substance is applied by printing.

31. The production method according to claim 17, wherein the second and third feature substances are applied to the value document substrate as separate substances.

* * * * *